United States Patent [19]

Hause et al.

[11] 4,361,963
[45] Dec. 7, 1982

[54] DIFFERENTIAL NONMETALS THICKNESS GAUGE

[75] Inventors: Leroy R. Hause, Seattle; Dean Y. Tsuchida, Renton, both of Wash.

[73] Assignee: The Boeing Company, Seattle, Wash.

[21] Appl. No.: 204,493

[22] Filed: Nov. 6, 1980

[51] Int. Cl.³ ............................................. G01B 7/06
[52] U.S. Cl. ................................................. 33/143 L
[58] Field of Search ............ 33/143 L, 147 N, 172 E; 324/229-231

[56] References Cited

U.S. PATENT DOCUMENTS 2,484,623  10/1949  Heising ......................... 33/143 L X
3,213,542  10/1965  Murtland ......................... 33/147 N

FOREIGN PATENT DOCUMENTS 515932  7/1976  U.S.S.R. ............................. 324/229
564514  8/1977  U.S.S.R. ............................. 324/229

*Primary Examiner*—Harry N. Haroian
*Attorney, Agent, or Firm*—Thomas H. Murray

[57] ABSTRACT

A gauge for measuring the thickness of a nonmetallic article employs differential air core transformer principles. A transmitting coil is axially aligned between two identical receiving coils. The test article is positioned between the transmitting coil and a first one of the receiving coils. The distance between the second receiving coil and the transmitting coil is adjusted until the signals received by the two receiving coils are balanced. The distance between the second receiving coil and the transmitting coil then corresponds identically to the distance between the transmitting coil and the first receiving coil. Direct reading measurement devices may be provided.

7 Claims, 1 Drawing Figure

DIFFERENTIAL NONMETALS THICKNESS GAUGE

BACKGROUND OF THE INVENTION

1. Field of the Invention

This invention relates to a gauge for determining the thickness of nonmetallic articles, more particularly a gauge which employs the principles of an air core transformer whose coefficient of coupling depends upon the distance between two electrical coils.

2. Description of the Prior Art

There are numerous applications where precise measurement of article thickness is desirable. The measurements are difficult where the article has an irregular shape and a thickness more than about 1 inch. One example is in measuring the thickness of glass fiber reinforced plastic dome structures. Such structures are hemispherical and may have a diameter of perhaps 30 feet. The structures are fabricated from glass fiber reinforced plastics and plastic-impregnated honeycomb reinforcement and have a thickness of about 2 inches. Uniformity of thickness is critical in such structures to assure that the domes present a uniform "window" for radiant energy waves passing therethrough. Conventional measuring means are not satisfactory for measuring the thickness of such hemispherical structures.

For articles having a thickness of 1 inch or less, there are available measuring instruments employing Eddy current principles which are accurate and precise for thickness measurements up to about 1 inch. The use of microwave techniques for thickness measurements of nonmetallic articles has exhibited variations in precision resulting from variations in the dielectric properties of the article which is measured.

A known measuring device employed a pair of electrical coils, positioned one on each side of an article to be measured. An alternating current signal, approximately 10 kilohertz, was applied to one coil and the signal from the other coil was measured. By prior calibration of the two coils, functioning as an air core transformer, it was possible to determine the distance between the two coils—and hence the thickness of the test article—by referring to the previously obtained and recorded calibration data. The air core transformer principle was independent of small variations in the dielectric composition of the article to be measured but its accuracy was affected by changes in temperature and by small amplitude or frequency variations in the signal source. By employing a constant temperature environment for measurements and by employing stable signal generators for the system, accuracies of ±0.010 inches at a 2 inch measurement distance were achieved.

Improved accuracy in measurement is desirable. A measuring gauge which does not require constant temperature environment or extremely stable signal generators also is desirable.

SUMMARY OF THE INVENTION

According to the present invention, a gauge for measuring the thickness of nonmetallic articles has been developed, employing the air core transformer principle. The gauge is independent of the temperature at the time of measurement, independent of small changes in the amplitude or frequency of the alternating current signal source. The present gauge can be direct reading.

According to this invention, a differential air core transformer principle is employed as a thickness measuring device. A transmitting coil and a first coil and a first receiving coil are positioned on each side of the test article whose thickness is to be measured. A duplicate receiving coil is positioned in alignment with the transmitting coil and the receiving coil. Electrical circuitry is provided for comparing the output signal from the first receiving coil and the duplicate receiving coil. Adjustment means are provided for altering the distance between the duplicate receiving coil and the transmitting coil until the comparison circuitry indicates a null. The distance between the duplicate receiving coil and the transmitting coil in the null condition is identical to the thickness of the article to be measured. The adjustment means for positioning the duplicate receiving coil preferably is provided with a direct reading device whereby the operator can obtain a direct reading of the thickness of the article to be measured.

The sensitivity of the gauge may be improved by providing a capacitor in parallel with each of the two receiving coils to permit tuning of the system.

DESCRIPTION OF THE PREFERRED EMBODIMENTS

Figure 1:
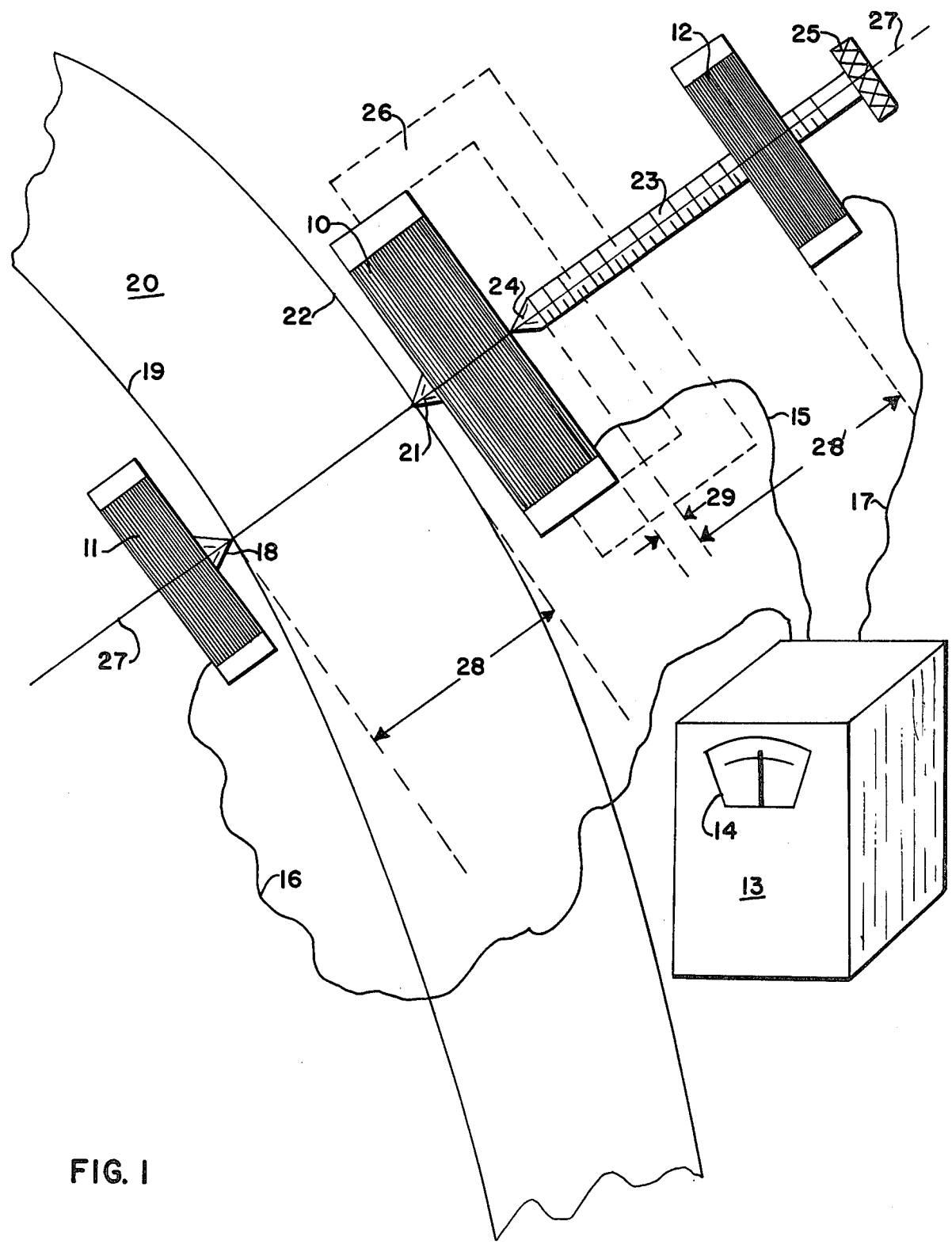
FIG. 1 is an illustration partly in cross-section and partly schematic illustrating the thickness measuring gauge of this invention.

The essential elements of the present measuring device are a transmitting coil 10, a first receiving coil 11, a duplicate receiving coil 12, a control unit 13 which includes a signal generator, a comparison circuit and a meter 14. The signal generator unit is connected through a conductor 15 to the transmitting coil 10 and when activated, delivers an alternating current signal of approximately 1.6 kilohertz to the transmitting coil. The first receiving coil 11 is connected by a conductor 16 to a comparison circuit within the control unit 13. The duplicate receiving coil 12 is connected by a conductor 17 to the comparison circuit within the control unit 13.

The first receiver coil 11 has a coaxial prod 18 which engages one surface 19 of a test article 20. The transmitting coil 10 has a similar prod 21 which engages the surface 22 of the test article 20. The duplicate receiving coil 12 is secured by an adjustable means such as a threaded shaft 23 which has a forward prod 24 which engages the housing of the transmitting coil 10. The duplicate receiving coil 12 is threadedly engaged to the threaded shaft 23 so that turning an adjustment handle 25 will cause the duplicate receiving coil 12 to move toward or away from the transmitting coil 10. Preferably a supporting structure such as a frame 26 is secured at its forward ends to the housing of the transmitting coil 10 and maintains the threaded shaft 23 in axial alignment with the transmitting coil 10. The first receiving coil 11, the transmitting coil 10 and the duplicate receiving coil 12 are maintained in axial alignment with an axis indicated at 27.

The housings for the coils 10, 11, 12 and the threaded shaft 23 and frame member 26 and the prods 18, 21, 24 are fabricated from the nonmetallic materials.

The transmitting coil 10 should be symmetrical, i.e., the winding should be cylindrical so that the normal flux distribution pattern on each side of the transmitting coil is identical. Similarly the first receiving coil 11 and the duplicate receiving coil 12 should be identical with respect to the size of wire, number of turns and dimensions of the coils.

Operation

The present device is assembled by positioning the transmitting coil 10 and duplicate receiving coil 12 in alignment on one side of a test article 20 with the prod 21 engaging the surface 22. Simultaneously, the first receiving coil 11 is positioned with its prod 18 engaging the surface 19 in alignment with the axis 27 already established by the transmitting coil 10 and duplicate receiving coil 12. The control unit 13 is activated whereby an alternating current signal is delivered to the transmitting coil 10, establishing a flux pattern which is intercepted by the first receiving coil 11. The distance between the prods 18, 21 affects the signal which is received by the first receiving coil 11 and delivered through the conductor 16 to the comparison circuit within the control unit 13. Simultaneously, the duplicate receiving coil 12 receives the same signal from the transmitting coil 10 and delivers the received signal through a conductor 17 to the comparison circuit within the control unit 13. The operator adjusts the adjustment handle 25 until the meter 14 indicates that the two signals from the conductors 16, 17 are identical. At this point, the distance between the duplicate receiving coil 12 and the transmitting coil 10 is measured.

It will be observed that the actual distance between the transmitting coil 10 and the first receiver coil 11 includes the thickness 28 of the test article 20 and also the thickness of the two prods 18, 21. The distance between the duplicate receiving coil 12 and the transmitting coil 10 includes a distance 28' and a prod thickness 29 which is equivalent to the thickness of the two prods 18, 21. The actual distance to be measured, thus, is the distance 28'. Preferably a direct readout device is provided with the frame 26 to permit the operator to obtain a direct reading of the distance 28' which corresponds to the actual thickness 28 of the test article 20.

A capacitor may be provided in parallel with each of the two receiving coils to permit tuning of the system. This is particularly desirable when the conductors 16, 17 are long, e.g., 60 feet or more.

Test Results

A gauge was constructed from two receiving coils and one transmitting coil. The two receiving coils had 400 turns of No. 39 magnet wire. The transmitting coil had 600 turns of No. 39 magnet wire. Each coil had an inner diameter of 1.5 inches, an outer diameter of 1⅝ inches and a width of about 0.25 inch. Each receiving coil had a capacitor, 0.1 μF connected in parallel. The signal applied to the transmitting coil was about 1.6 kilohertz. The conductors were coaxial cables about 60 feet long.

A glass fiber reinforced plastic and plastic-impregnated honeycomb hemisphere, approximately 30 feet in diameter, and approximately 2 inches thick, was employed as a test specimen. The actual thickness of the hemisphere was between 1.6 inches and 2.7 inches. The thickness of the hemisphere was measured at 60 different locations. Repeat measurements were made at 54 of the 60 locations. The maximum deviation between original and repeat readings was 0.007 inch. The average difference between original and repeat readings was 0.00117 inch. Part of the discrepancy between the original and repeat readings can be attributed to the inherent waviness of the outer surface of the hemisphere—a condition which affects any measurement technique.

Measurements were carried out with the present device on smooth surfaced thickness standard test articles. The reproducibility of those measurements was ±0.002 inches at a 2 inch thickness.

The present measurement gauge is independent of the measurement temperature since both receiving coils experience the same temperature. Similarly, variations in the amplitude or frequency of the signal generator affect both receiving coils identically and thus do not influence the measurement.

We claim:

1. A gauge for determining the thickness of a nonmetallic article comprising:
   an AC signal generator;
   a transmitting coil connected to said generator;
   a first receiving coil and a duplicate receiving coil, each axially aligned with said transmitter coil on opposite sides thereof and each adapted to receive AC signals therefrom;
   means for delivering AC signals from said first receiving coil and from said duplicate receiving coil to a comparison means:
   a first means extending from said first receiving coil for engaging one surface of an article whose thickness is to be determined;
   a second means extending from said transmitting coil for engaging the opposed surface of the said article;
   linearly adjustable mounting means between said duplicate receiving coil and said transmitting coil;
   means for measuring the length of said adjustable mounting means.

2. The gauge of claim 1 wherein the said comparison means is a signal nulling means.

3. The gauge of claim 1 wherein the said linearly adjustable mounting means includes a threaded shaft, threadedly secured to the said duplicate receiving coil.

4. The gauge of claim 1 including means for indicating the length of said adjustable mounting means.

5. A gauge according to claim 4 wherein said means for indicating the length of the said adjustable mounting means includes a direct readout device indicating the instantaneous position of the said second receiving coil with respect to the said mounting means.

6. The gauge of claim 1 wherein the said first means is a coaxial prod extending in the direction of the said transmitting coil and the said second means is a coaxial prod extending in the direction of the said first receiving coil, each of said prods being adapted to engage an article whose thickness is to be measured.

7. The gauge of claim 6 wherein the said duplicate receiving coil has an axially threaded prod coaxially mounted with respect to the said duplicate receiving coil and with respect to the said transmitting coil, said threaded prod having its forward end fixed relative to the said transmitting coil, whereby rotation of the said threaded prod moves the said duplicate receiving coil with respect to the said transmitting coil.

* * * * *